United States Patent [19]
Wakabayashi et al.

[11] Patent Number: 4,914,466
[45] Date of Patent: Apr. 3, 1990

[54] BRACKETING EXPOSURE CONTROL DEVICE

[75] Inventors: Tsutomu Wakabayashi, Tokyo; Tetsuro Goto, Funabashi, both of Japan

[73] Assignee: Nikon Corporation, Tokyo, Japan

[21] Appl. No.: 335,870

[22] Filed: Apr. 10, 1989

[30] Foreign Application Priority Data

Apr. 11, 1988 [JP] Japan .................................. 63-87241
Sep. 5, 1988 [JP] Japan ................................. 63-221939
Oct. 14, 1988 [JP] Japan ................................. 63-257231

[51] Int. Cl.⁴ .............................................. G03B 7/26
[52] U.S. Cl. .................................................. 354/412
[58] Field of Search ............... 354/412, 410, 441, 442, 354/458, 483

[56] References Cited

U.S. PATENT DOCUMENTS 3,762,285 10/1973 Tenkumo ............................ 354/458
4,734,727 3/1988 Takemae ............................ 354/412

Primary Examiner—Michael L. Gellner
Assistant Examiner—David M. Gray
Attorney, Agent, or Firm—Shapiro and Shapiro

[57] ABSTRACT

A bracketing exposure control camera having a total exposure shift range calculated based on the number of frames and the exposure shift amount. If the total exposure shift range overflows a predetermined exposure shift range, then the number of frames and/or the exposure shift amount is adjusted to maintain the adjusted total exposure shift range within the predetermined exposure shift range.

8 Claims, 21 Drawing Sheets

MODE 1

MODE 2

MODE 3

MODE 4

MODE 1

MODE 2

MODE 3

MODE 4

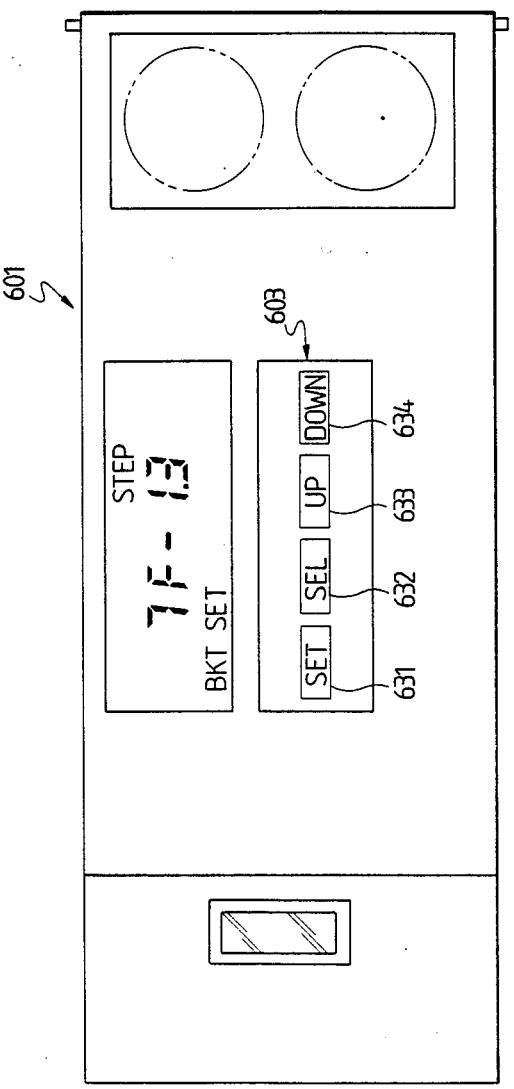

MODE 1

MODE 2

MODE 3

MODE 4

BRACKETING EXPOSURE CONTROL DEVICE

BACKGROUND OF THE INVENTION

1. Field of the Invention

The present invention relates to a device for enabling so-called bracketing exposure operation, in which exposure operation is conducted with a predetermined exposure value and at least another exposure value determined by slightly varying said predetermined exposure value, thereby photographing an object with slightly varied exposure values respectively on different film frames.

2. Related Background Art

Bracketing exposure device is already disclosed for example in the U.S. Pat. Nos. 3,762,285 and 4,734,727, and camera systems with such exposure function are already available commercially.

In such known bracketing exposure operation, there are designated a start exposure value for the first exposure, the amount of shift in exposure value between frames and the number of frames to be photographed, prior to an exposure starting operation, whereby exposure are made on the film frames of the designated number, starting from a first exposure with the designated start exposure value, with stepwise shifted exposure values toward the overexposure side. However, the controllable range of exposure value, namely diaphragm aperture and shutter speed, is limited in the camera. In the commercially available camera systems, therefore, the number of exposure frames and the amount of shift in exposure value between the frames in the bracketing exposure mode are limited within a certain finite range, so that the exposure value in each frame in the bracketing exposure operation does not exceed the upper or lower limit of the exposure value set in the camera, as long as the designation is made within said range. More specifically, the maximum limit of the range of each designated value is so defined that the exposure values in the bracketing exposure operation does not exceed the upper limit of the exposure value determined in the camera in any combination of the start exposure value, number of frames and shift of exposure value between frames.

However, in such limitation of ranges, even when the number of frames to be photographed is selected at the minimum value, the amount of shift in exposure value between the frames is limited by the same condition as when the number of frames is selected at the maximum value. Consequently, the shift in exposure value becomes limited though there is still an enough margin to the upper limit of the exposure value defined in the camera.

SUMMARY OF THE INVENTION

The object of the present invention is to provide a bracketing exposure control device capable of improving the efficiency in the automatic bracketing exposure operation.

The present invention is applied to a bracketing exposure control device for designating the number of frames and the shift in exposure value between frames, for exposing plural frames in succession with stepwise shifted exposure values. There is made a discrimination whether the shift range of the exposure value, determined by the designated number of frames and the designated shift in exposure value exceeds the upper or lower limit of the predetermined shift range, and, if not, said designated values are adopted without change. On the other hand, if such exceeding occurs, the number of frames and/or shift in exposure value thus designated is modified, or the designated values are cancelled and the immediately preceding condition is adopted.

BRIEF DESCRIPTION OF THE DRAWINGS

FIG. 18 is a plan view of a data back unit constituting a seventh embodiment;

DESCRIPTION OF THE PREFERRED EMBODIMENTS

Figure 1:
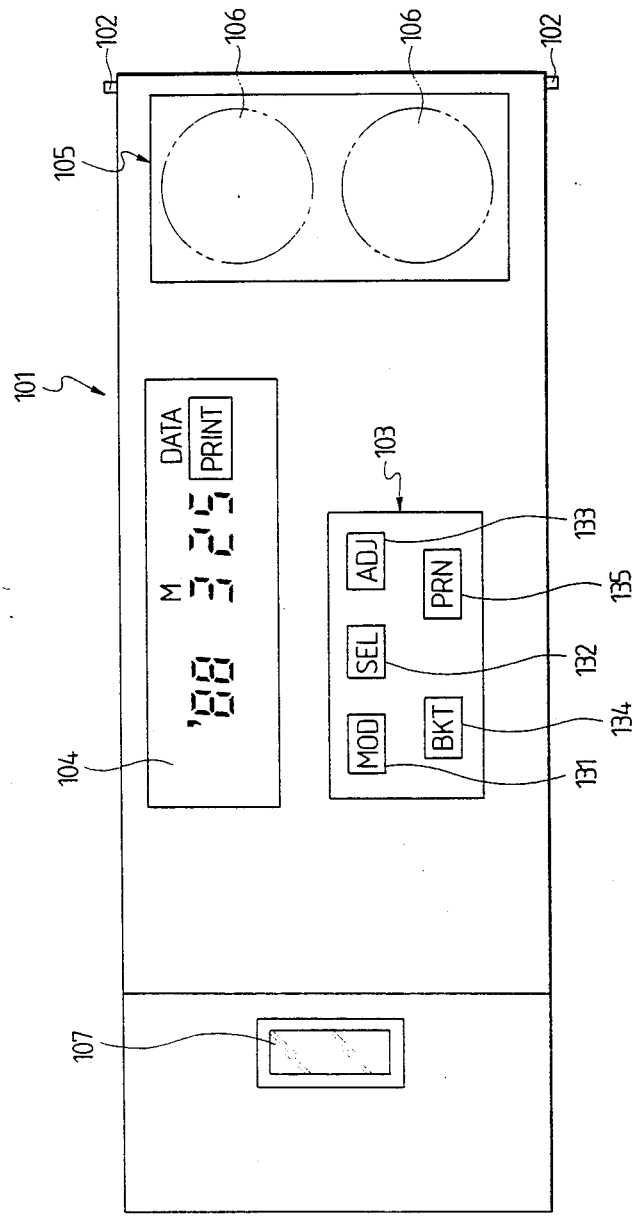
FIG. 1 is a front view of a data back unit embodying the present invention.

FIG. 1 is an external view of a data back unit capable of recording data on a photographic film loaded in a camera. The data back unit 101 can replace the rear cover the camera body, and is mounted on the camera body so as to be openable by a hinge 102. A setting panel 103 for setting the data to be recorded and setting an auto bracketing function, is provided with operating buttons 131–135. A liquid crystal data display unit 104 serves to display data set by the setting panel 103. A battery chamber 105 houses two batteries 106 as the power source for the data back unit 101. A window 107 is provided for confirming whether a film cartridge is loaded in the camera body.

Figure 5:
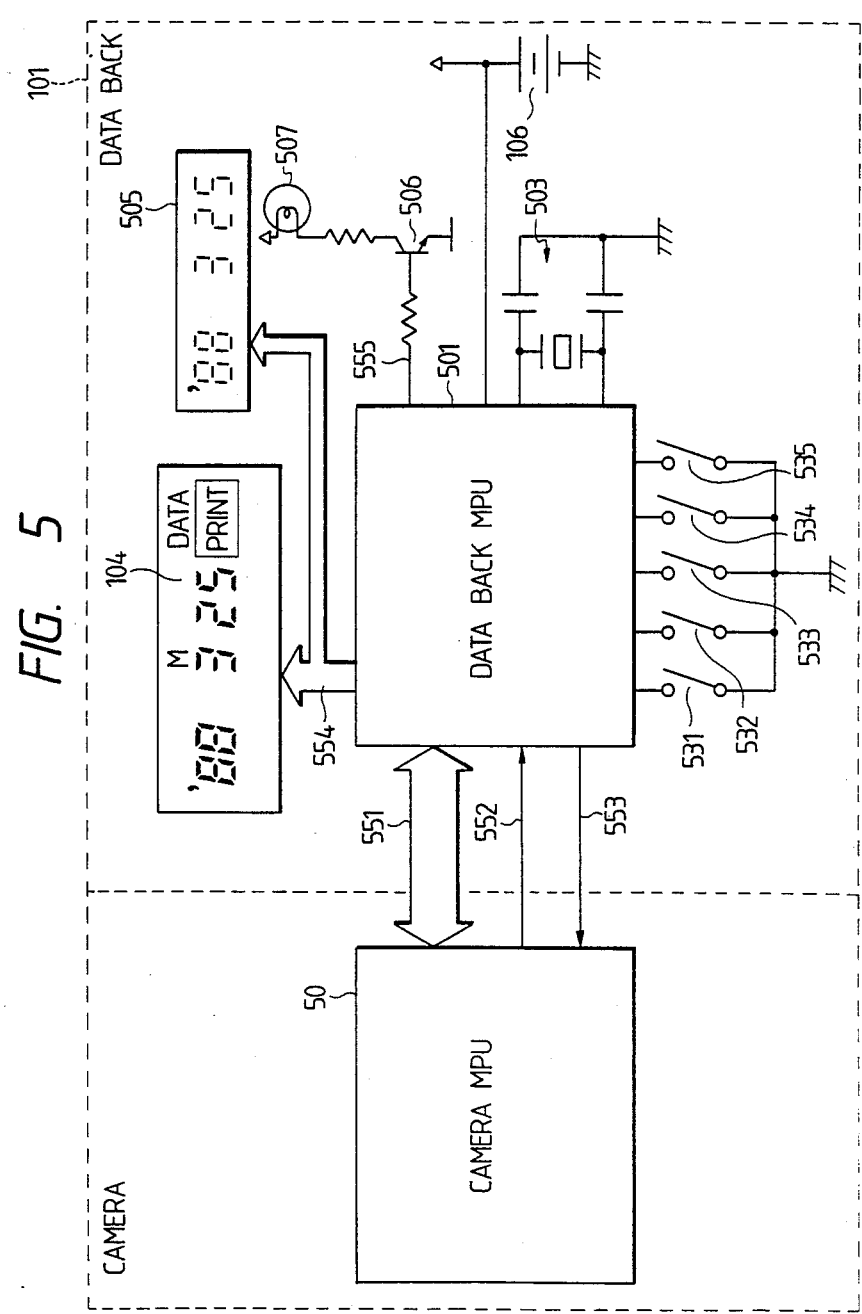
FIG. 5 is a block diagram of a data back unit and a camera.

When the data back unit 101 is mounted on the camera body, a microcomputer (MPU) 50 of the camera body shown in FIG. 5 is connected to a micro computer (MPU) 501 of the data back unit, thereby enabling data transmission therebetween.

In response to the depression of an unrepresented shutter release button over a first stroke, the MPU 50 of the camera body activates a light metering device (not shown), thereby determining a correct exposure value. In the bracketing exposure mode, the automatic bracketing exposure operation is conducted according to a number n of frames and an amount of exposure shift x, entered from the MPU 501 of the data back unit, and said correct exposure value.

The MPU 501 of the data back unit is powered by the batteries 106 shown in FIG. 1, and clock pulses necessary for various operations and time counting are obtained from a reference oscillator 503 and an unrepresented incorporated oscillator circuit. Said MPU 501 is connected to switches 531–535 to be turned on or off in relation to the actuation of the buttons 131–135 on the above-mentioned setting panel 103, and to the liquid crystal display unit 104, and signals are entered into the MPU 501 by the closing of said switches.

The MPU 501 of the data back unit not only exchange information signals 551 indicating for example correct exposure value with the MPU 50 of the camera body, but also receive therefrom a control signal 552 for controlling the data back unit 101 and sends thereto a control signal 553 for controlling the camera body.

In addition the MPU 501 sends a display signal 554 to the liquid crystal data display unit 104 shown in FIG. 1 and a data recording liquid crystal display unit 505 thereby causing displays thereon. When a data recording mode is set in the MPU 501, it releases, at the exposure operation, a data recording signal 555 to turn on a transistor 506, thereby turning on a recording lamp 507. Thus, the data are recorded on the photographic film by the light transmitted by the data recording liquid crystal display unit 505.

Figure 2:
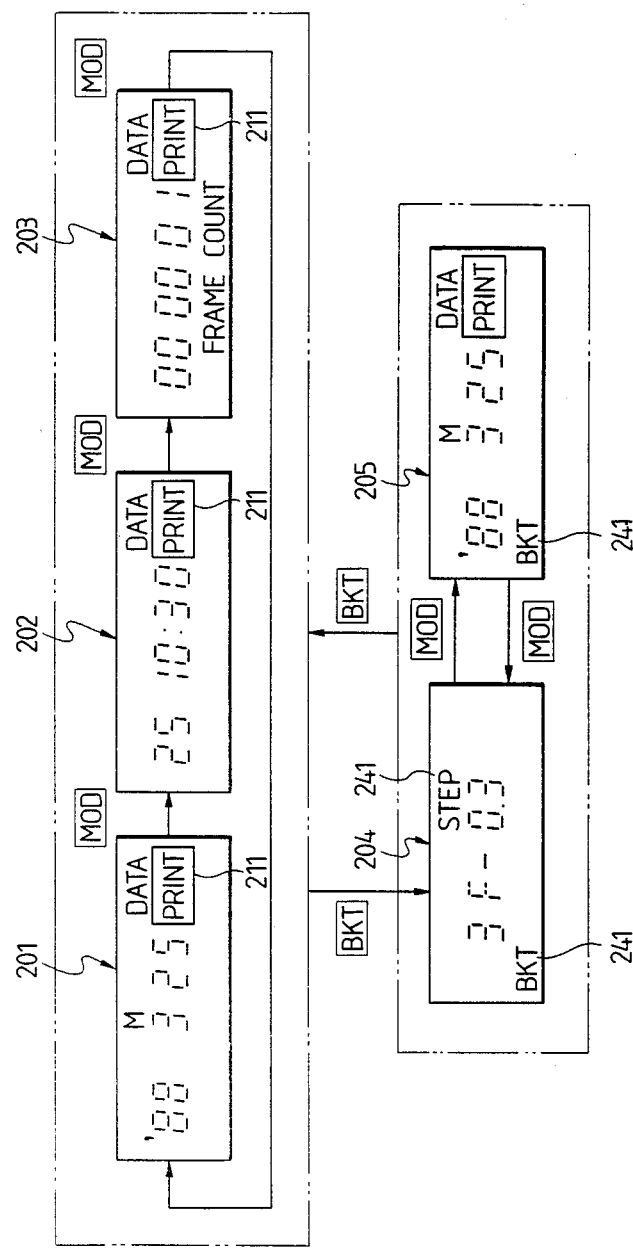
FIG. 2 is a view showing the switching of display on the data back unit shown in FIG. 1.

Now reference is made to FIG. 2 for explaining the functions of the buttons 131–135 of the setting panel 103.

The liquid crystal data display unit 104 is normally in a display mode 201 for data recording, indicated by display characters "DATA". This display mode 201 shows year, month and day. The illustrated example indicates Mar. 25, 1988. An apostrophe (') is shown as an auxiliary display for the year, and "M" indicates the month.

In the display mode 201, the depression of the display switching button 131 shifts the display unit 104 to a display mode 202 for displaying the day, hour and minute. The illustrated example indicates 25th day, 10:30 hours. In the display mode 202, the depression of the display switching button 131 shifts the display unit 104 to a display mode 203 for displaying the frame count. In this mode characters "FRAME COUNT" are turned on, and the illustrated numeral "1" indicates the current frame count 1. Said frame count increases by one at a time, at each exposure operation. By the depression of the button 131 in this display mode 203, the display returns to the mode 201.

When the record setting button 135 (FIG. 1) is depressed while the display unit 104 is in one of these display modes 201–203, the MPU 501 of the data back unit sets a recording mode and turns on characters 211 "PRINT". If said setting button 135 is depressed again while said characters PRINT 211 are turned on, the MPU 501 cancels the recording mode and turnes off the characters 211.

If the shutter is released while said characters 211 are turned on, the displayed data are recorded on the film. Data recording is not conducted when the characters 211 are turned off.

If a bracketing setting button 134 is depressed in one of the data recording display modes 201–203, the MPU 501 sets the bracketing mode and switches the liquid crystal display unit 104 to a bracketing display mode 204, in which characters "BKT" 241 and characters "STEP" 242 indicating the bracketing mode are turned on, and the number of frames and the exposure shift per frame in the bracketing exposure are displayed. A numeral at the left of character "F" indicates the number of frames to be photographed, and numerals at the right of symbol "-" or below the characters "STEP" indicate the amount of exposure shift per frame. If the display switching button 131 is depressed in the display mode 204, the display is switched to a display mode 205 for indicating the recording data, selected immediately before the switching to the display mode 204 by the bracketing setting button 134. In this state the characters "BKT" 241 remain turned on, indicating that the bracketing mode is still continued. If the display switching button 131 is depressed in the display mode 205, there is restored the display mode 204 indicating the number of frames and the exposure shift per frame in the auto bracketing exposure operation.

If the bracketing setting button 134 is depressed in the display mode 204 or 205, the MPU 501 cancels the bracketing mode and switches the liquid crystal display unit 104 to one of the display modes 201–203, shown immediately before the switching to the display mode 204 by the bracketing setting button 134.

Figure 4:
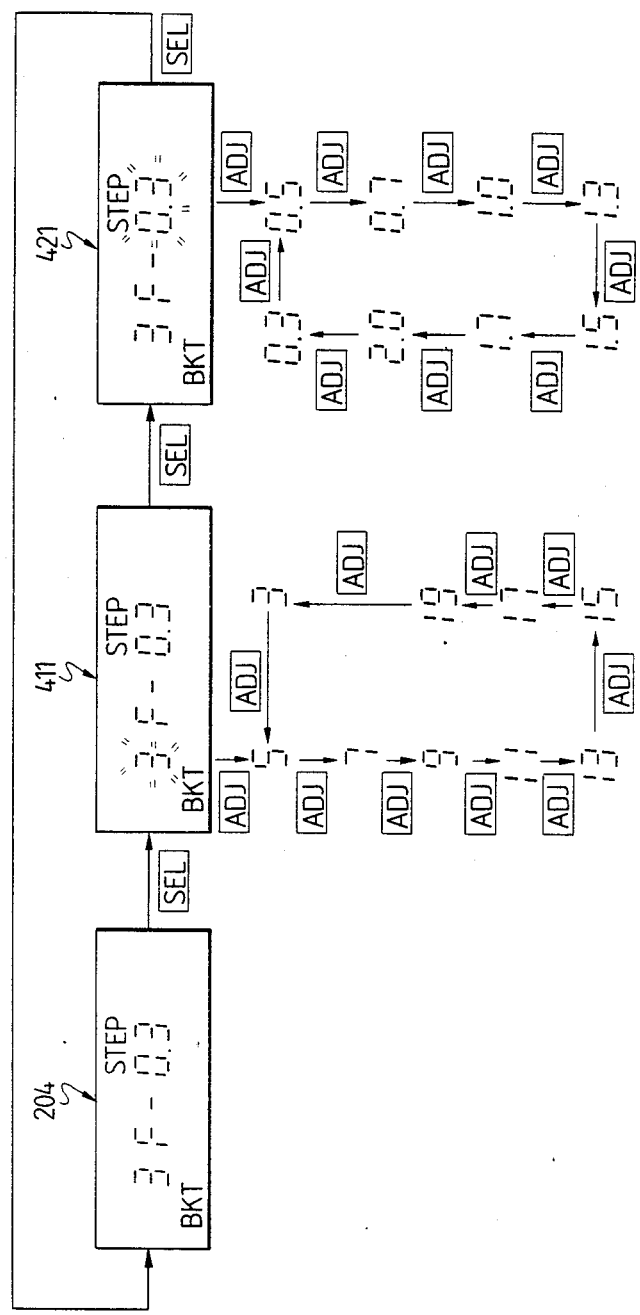
FIG. 4 is a view showing the switching of display.

In the following there will be explained the procedure of modifying the frame number n and the exposure shift x per frame in the auto bracketing exposure operation, with reference to an example shown in FIG. 4.

It is assumed that the liquid crystal display unit 104 is in the display mode 204, shown in FIG. 2, for displaying the number n of frames and the exposure shift x per frame, and that said number n is "3" and said exposure shift x is "0.3". These values can be modified by a selecting button 132 and an adjusting button 133 shown in FIG. 1. When the selecting button 132 is depressed in the display mode 204 shown in FIG. 4, the display is changed to a display mode 411, in which the number "3" of frames flashes and is modifiable. Said number is changed to "5" by a depression of the adjusting button 133 in this state. Said number n of frames is then changed, in succession, to "7", "9", "11", "13", "15", "17" and "19" by subsequent depressions of the adjusting button 133, and returns to "3" by a depression of the button 133.

After the number n of frames is set at a desired value by the above-explained procedure the depression of the selecting button 132 changes the display from the display mode 411 to a display mode 412, in which the number n of frames is continuously turned on but the exposure shift x ("0.3") per frame flashes and becomes modifiable. Said shift "0.3" is changed to "0.5" by a depression of the adjusting button 133 in this state. Said exposure shift x is then changed, in succession, to "0.7", "1.0", "1.3", "1.5", "1.7" and "2.0" by subsequent depression of the adjusting button 133, and returns to "0.3" by an additional depression of the button 133.

After the exposure shift x per frame is set at a desired value by the above-explained procedure, a depression of the selecting button 132 changes the display unit 104 from the display mode 411 to the display mode 204 again.

Figure 3:
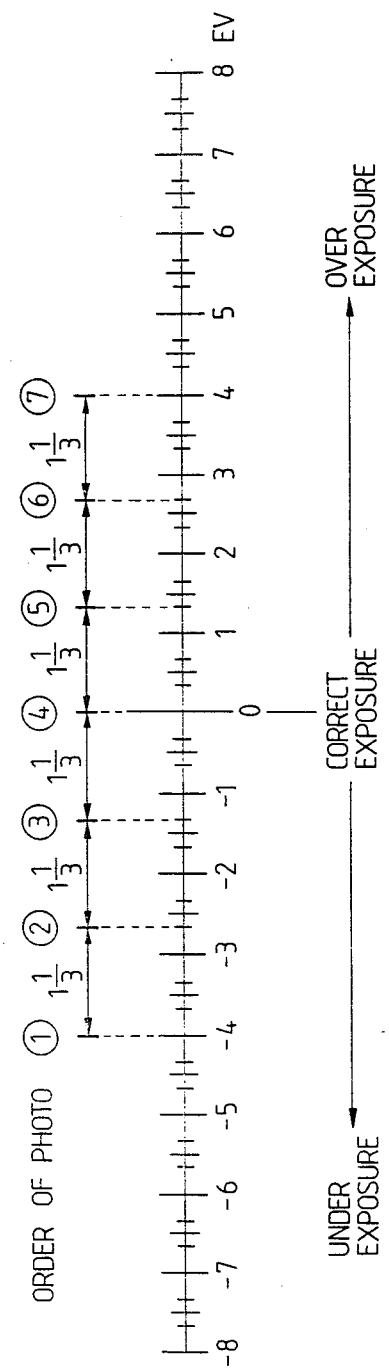
FIG. 3 is a schematic view showing an example of automatic bracketing exposure and shift in exposure value.

Let us consider a case in which the camera body has an exposure shift range from −8 EV to +8 EV, as shown in FIG. 3, with the correct exposure at 0 EV. This range is so defined because the camera body may become unable to control the exposure value outside said range. On the other hand, in the auto bracketing exposure operation, the number of frames can be selected as an odd number from 3 to 19, and the exposure shift x per frame can be varied from 0.3 to 2.0. Consequently, a setting for example of n=19, x=20 is possible, but the range of change in the exposure value in this case will be from −18 EV to +18 EV, with the correct exposure at 0 EV. Stated differently, the exposure value in the auto bracketing exposure operation will overflow the above-mentioned exposure range (from −9 EV to +8 EV) unless the number n of frames and the exposure shift x per frame satisfy a relation:

$$\frac{n-1}{2} \cdot x \leq 8 \quad (1)$$

FIG. 3 shows the sequence of exposures and the deviations from the correct exposure, in case of 7 exposures with an exposure shift of 1⅓ EV per frame.

In the following there will be explained with certain examples, the control in case the change in exposure amount exceeds the above-mentioned range from −8 EV to +8 EV in the auto bracketing exposure operation.

Figure 6:
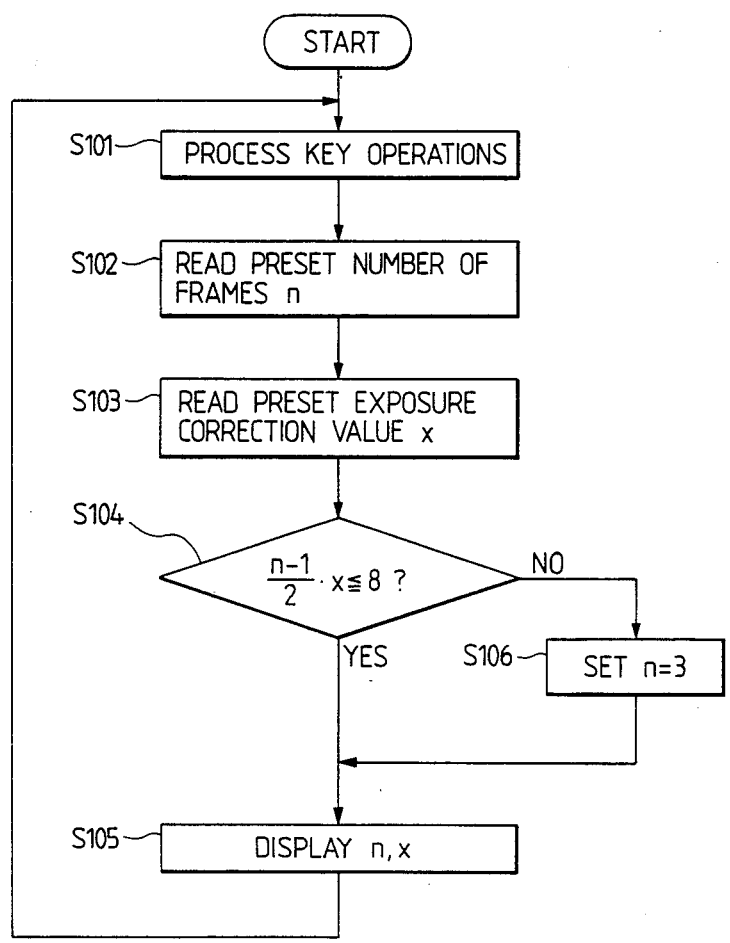
FIG. 6 is a flow chart showing the control sequence of a first embodiment.

FIG. 6 shows the control sequence of a first embodiment in which the exposure shift x per frame is preferentially selected and the number n of frames is forcedly set at a predetermined number.

When the power supply is started in the data back unit 501, the sequence shown in FIG. 6 is started, and a step S101 executes a key operation for identifying the depressed keys 131–135 from the state of the switching 531–535.

Then a step S102 reads the number n of frames entered by a key, and a step S103 reads the exposure shift x per frame entered by a key. Subsequently a step S104 calculates the value of:

$$\frac{n-1}{2} \cdot x$$

and discriminates whether said value is equal to or smaller than 8. If said value is equal to or smaller than 8, the sequence proceeds to a step S105 for displaying the number n of frames and the exposure shift x per frame and releasing the display signal 554, and the sequence returns to the step S101.

On the other hand, if the step S104 discriminates that said value exceeds 8, a step S106 sets the number n of frames at 3, and sequence jumps to the step S105.

In the first embodiment explained above, if the relationship of the number of frames and the exposure shift per frame exceeds the limiting condition, the number of frames is reduced to 3 for satisfying the limiting condition, and the number of frames is reduced to the minimum value of 3 as a warning of overflow of the limiting condition. Such embodiment meets the situation of auto bracketing exposure operation in which preference is generally given to the exposure shift per frame.

FIGS. 7A to 7D show examples of display in the control sequence explained above.

Figure 7A:
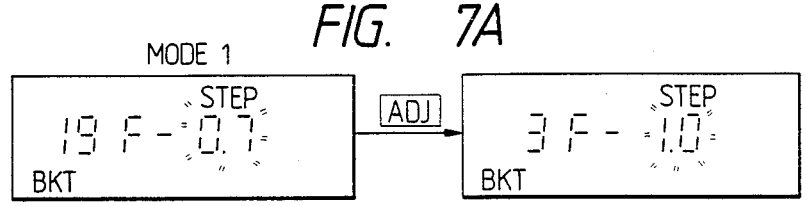
FIGS. 7A, 7B, 7C and 7D are views showing the switching of display at modifications of conditions in the first embodiment.
Figure 7B:
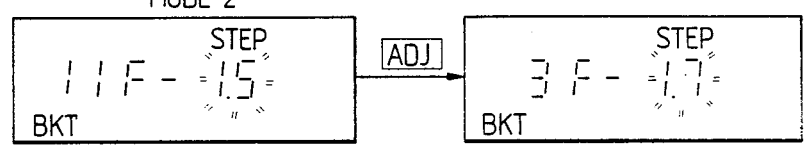

FIGS. 7A and 7B show the displays in the course of modification of the exposure shift x per frame. In a state shown in FIG. 7A, there are selected the number n of frames as "19" and the exposure shift x per frame as "0.7", which satisfy the aforementioned relation (1) and are displayed on the display unit 104 as indicated by MODE 1. However, if the adjusting button 133 is depressed in this state to modify the exposure shift x to "1.0", the relation (1) is no longer satisfied. Consequently the discrimination in the step S104 shown in FIG. 6 becomes negative, so that the step S106 sets the number n of frames at "3" and the step S105 displays said setting. Thus the display unit 104 changes the state as shown at the right-hand side in FIG. 7A. Said n=3 is the minimum number n of frames satisfying the relation (1) in case of x=1.0.

In a state shown in FIG. 7B, there are selected the number n of frames as "11" and the exposure shift x per frame as "1.7", which satisfy the aforementioned relation (1) and are displayed as indicated by MODE 2. However the relation (1) is no longer satisfied if the exposure shift x is modified to "1.7". Thus the discrimination of the step S104 becomes negative as explained above, so that the step S106 sets the number n of frames at "3".

Figure 7C:
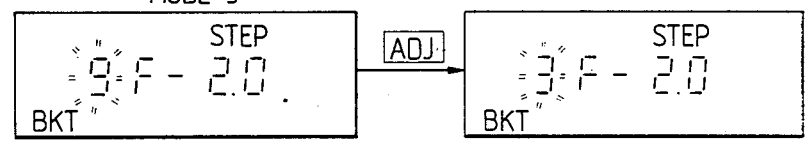
Figure 7D:
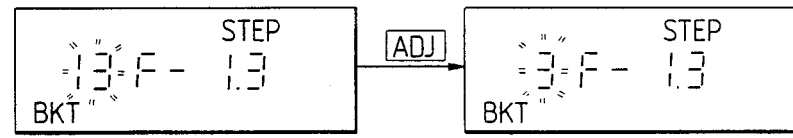

FIGS. 7C and 7D show displays in the course of modification of the number n of frames. In a state shown in FIG. 7C, there are selected the number n of frames as "9" and the exposure shift x per frame as "2.0", which satisfy the aforementioned relation (1) and are displayed as indicated by MODE 3. However, the relation (1) is no longer satisfied if the number n of frames is set at "11" or larger. Thus, the number n is returned to "3" if it is increased to "11" with the adjusting button 133.

In a state shown in FIG. 7D, there are selected the number n of frames as "13" and the exposure shift x per frame as "1.3", which satisfy the aforementioned relation (1). The relation (1) is however no longer satisfied at a number n of frames equal to or larger than "15". Thus the number n is returned to "3" if it is increased to "15" with the adjusting button 133.

Figure 8:
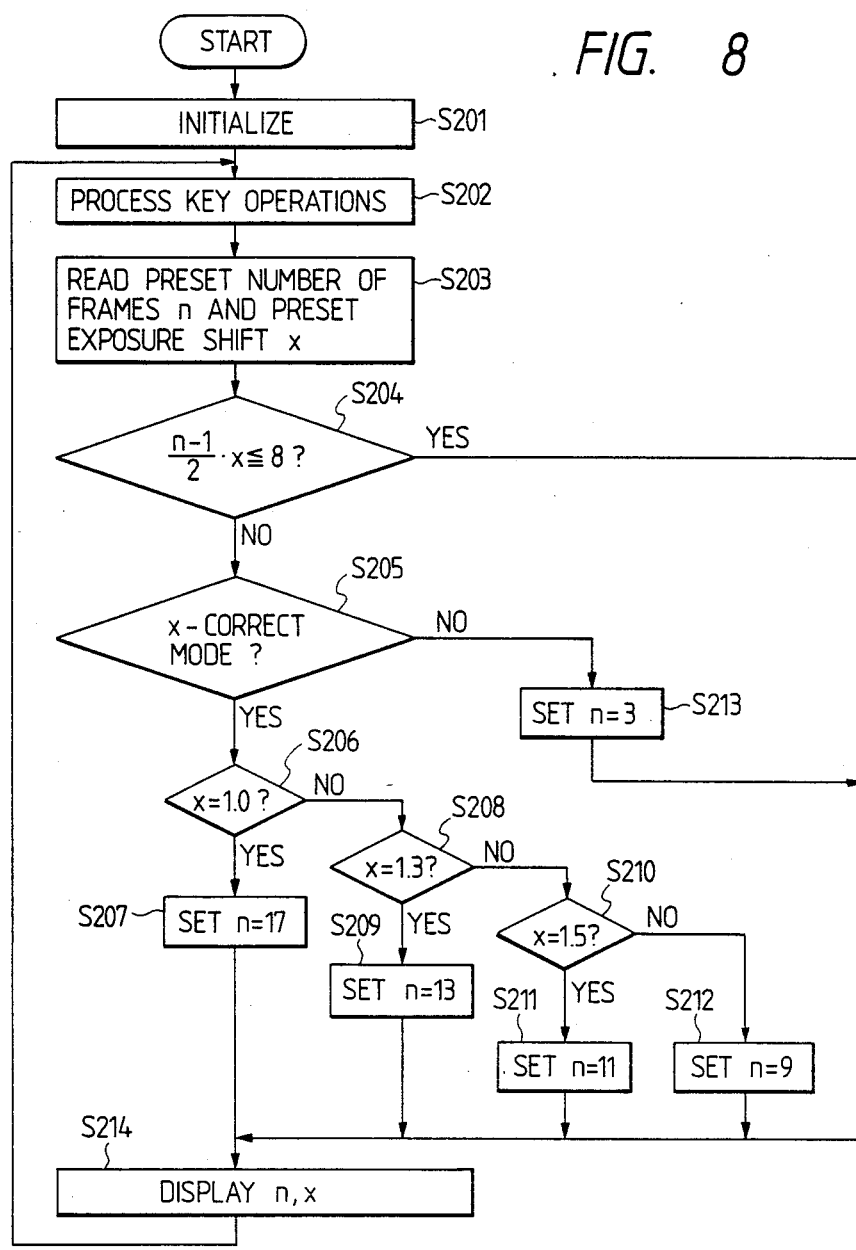
FIG. 8 is a flow chart showing the control sequence of a second embodiment.

FIG. 8 shows the control sequence of a second embodiment in which preference is given to the setting of the exposure shift x, and the number n of frames is adjusted to satisfy the relation (1).

When the power supply is started in the MPU 501, the sequence shown in FIG. 8 is activated, and a step S201 executes initialization, whereby the number n of frames and the exposure shift x per frame in the automatic bracketing exposure operation are set at initial values. Subsequent steps S202–S204 process key inputs, then read the number n of frames and the exposure shift x per frame and discriminate whether the value of:

$$\frac{n-1}{2} \cdot x$$

is equal to or smaller than 8, in the same manner as explained above in relation to FIG. 6. If the discrimination in the step S204 turns out negative, the sequence proceeds to a step S205 to discriminate whether the exposure shift x per frame is in the course of modification. If said shift x is in the course of modification, the display unit 104 has been switched to the display mode 421 shown in FIG. 4, and the sequence proceeds to a step S206 for discriminating whether the exposure shift x per frame is "1.0". If so, a step S207 sets the number n of frames at "17", then the sequence proceeds to a step S214 for send the display signal to the display unit 104 for displaying the number n of frames and the exposure shift x per frame, and then returns to the step S202.

If the discrimination of the step S206 turns out negative, the sequence proceeds to a step S208 for discriminating whether the exposure shift x per frame is "1.3". If so, a step S209 sets the number n of frames at "13", and the sequence proceeds to the above-mentioned step S214. If the discrimination of the step S208 turns out negative the sequence proceeds to a step S210 for discriminating whether the exposure shift x per frame is "1.5". If so, a step S211 sets the number n of frames at "11", and the sequence proceeds to the step S214. If the discrimination of the step S210 is negative, namely if the exposure shift x per frame is equal to or larger than "1.5", the sequence proceeds to a step S212 for setting the number n of frames at "9" and then to the step S214.

On the other hand, if the discrimination of the step S205 turns out negative, namely if the number n of frames is in modification, the sequence proceeds to a step S213 for setting the exposure shift x per frame at "3", and then to the step S214. If the discrimination of the step S204 turns out affirmative, the sequence proceeds directly to the step S214.

In the following there will be explained examples of display in the control sequence explained above.

Figure 9A:
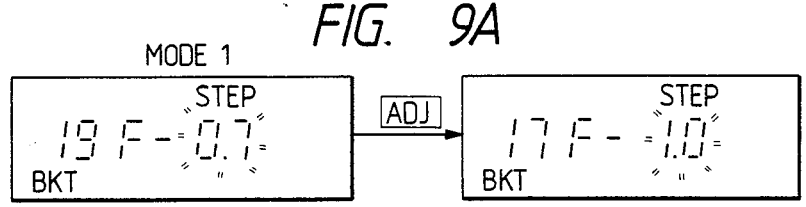
FIGS. 9A, 9B, 9C and 9D are views showing the switching of display at modifications of conditions in the second embodiment.

In a state MODE 1 shown in FIG. 9A, if the exposure shift x per frame is modified to "1.0" with the adjusting button, the relation (1) is no longer satisfied. Consequently the discrimination of the step S204 in FIG. 8 becomes negative while those of the steps S205, S206 become affirmative, so that the step S207 sets the number n of frames at "17" and the step S214 displays said setting. Thus the display unit indicates n=17 and x=1.0. The condition n=17 is the maximum number n of frame capable of satisfying the relation (1) for x=1.0.

Figure 9B:
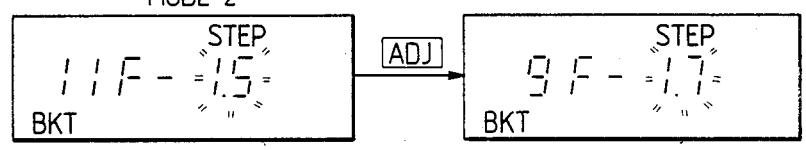

Also in a display state MODE 2 shown in FIG. 9B, the relation (1) is no longer satisfied if the exposure shift x per frame is modified to "1.7" with the adjusting button. Consequently the discrimination of the step S204 becomes negative, that of the step S205 becomes affirmative, and those of the steps S206, S208 and S210 become negative, so that the number n of frames is set at "9". In this manner there are displayed n=9 and x=1.7. The condition n=9 is the maximum number n of frames capable of satisfying the relation (1) for x=1.7.

Figure 9C:
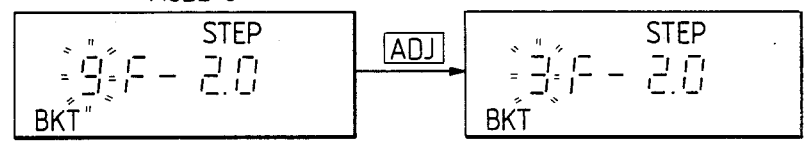

In a display state MODE 3 shown in FIG. 9C, the number n of frames skips "19" and returns to "3" if it is adjusted to "11" or larger.

Figure 9D:
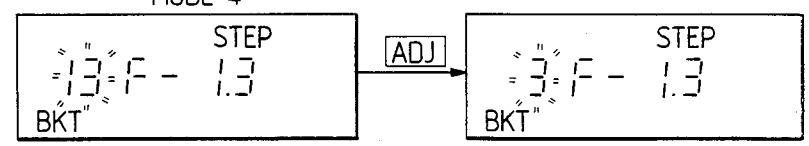

In a display state MODE 4 shown in FIG. 9D, the number n of frames skips "19" and returns to "3" if it is adjusted to "15" or larger.

Figure 10:
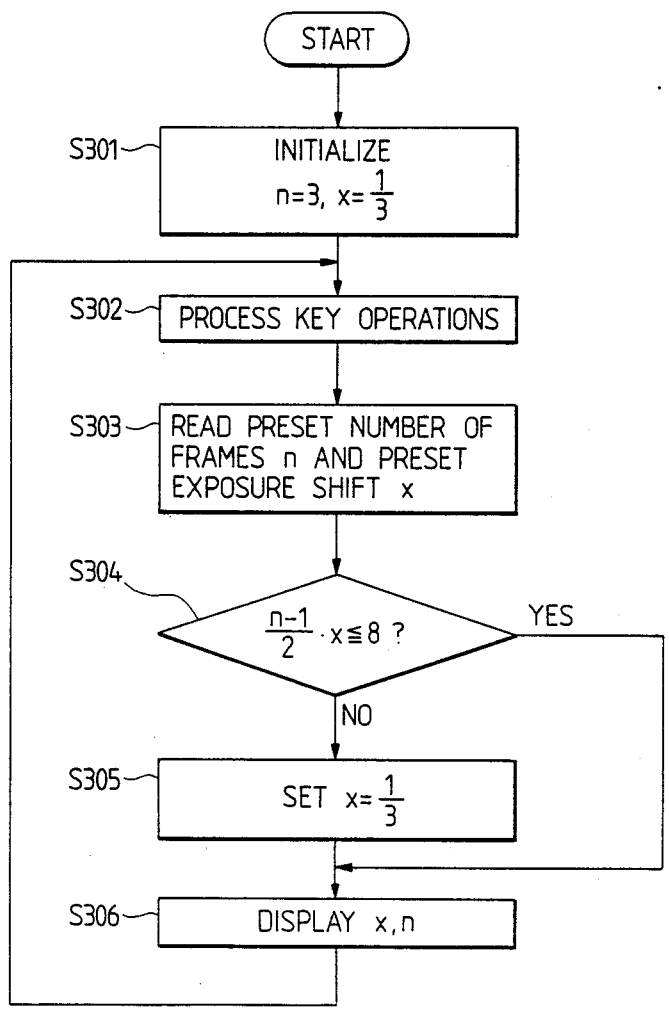
FIG. 10 is a flow chart showing the control sequence of a third embodiment.

FIG. 10 shows the control sequence of a third embodiment in which preference is given to the setting of the number of frames, and, if a proposed setting does not satisfy the aforementioned relation (1), the exposure shift x per frame is forcedly modified or reset to a minimum value ⅓.

When the power supply to the MPU 501 is started, the sequence shown in FIG. 10 is activated, and steps S301–S304 execute initialization by setting n at "3" and x at "⅓", then execute key input process, read the number n of frames and the exposure shift x per frame, calculate the value of:

$$\frac{n-1}{2} \cdot x$$

and discriminate whether said value is equal to or less than 8, in the same manner as already explained in relation to FIG. 8.

If said value is larger than 8, the sequence proceeds to a step S305 for setting the exposure shift x per frame at "⅓".

Then a step S306 releases the display signal 554 for displaying the number of frames and the exposure shift per frame, and the sequence returns to the step S302. On the other hand, if the step S304 discriminates that the calculated value is equal to or lower than 8, the sequence proceeds to the step S306.

Thus, in the above-explained sequence, the exposure shift x is forcedly set at x=Δ if the number n of frames and the exposure shift x per frame do not satisfy the relation (1).

Figure 11A:
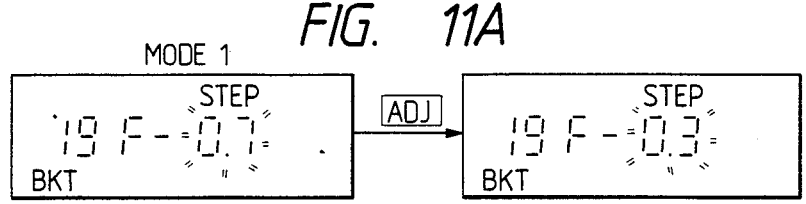
FIGS. 11A, 11B, 11C and 11D are views showing the switching of display at modifications of conditions in the third embodiment.

In a display state MODE 1 shown in FIG. 11A, the relation (1) is no longer satisfied if the exposure shift x per frame is modified to "1.0" by the adjusting button 133. Thus the step S305 modifies the value x to ⅓, and there are displayed n=19 and x=0.3.

Figure 11B:
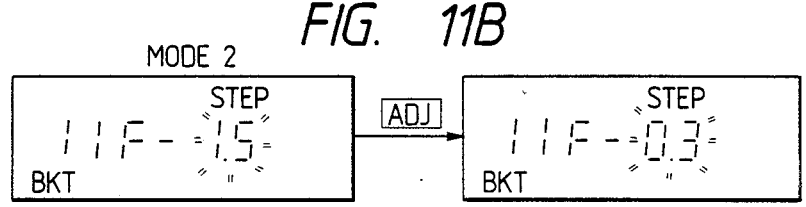

Also in a display state MODE 2 shown in FIG. 11B, the relation (1) is no longer satisfied if the exposure shift x per frame is modified to "1.7. Thus the value of x is forcedly modified to ⅓, and there are displayed n=11 and x=0.3.

Figure 11C:
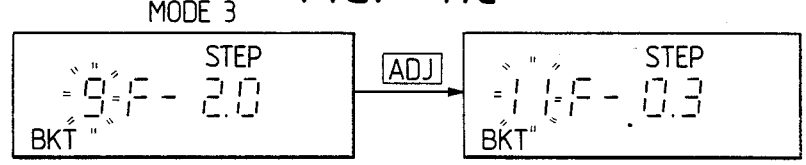

Also in a display state MODE 3 shown in FIG. 11C, the exposure shift x per frame is forcedly modified to ⅓ if the number n of frames is set at "11" or larger, and there are thus displayed n=11 and x=0.3.

Figure 11D:
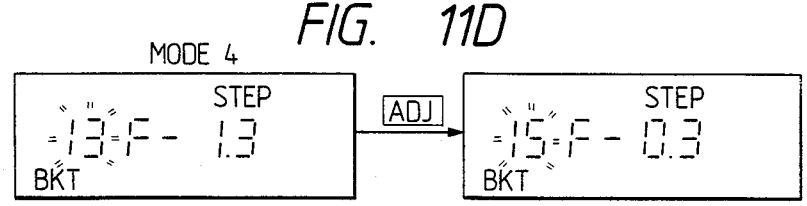

In a display state MODE 4 shown in FIG. 11D, the exposure shift x per frame is forcedly modified to ⅓ if the number n of frames is set at "15" or larger, and there are thus displayed n=15 and x=0.3.

Figure 12:
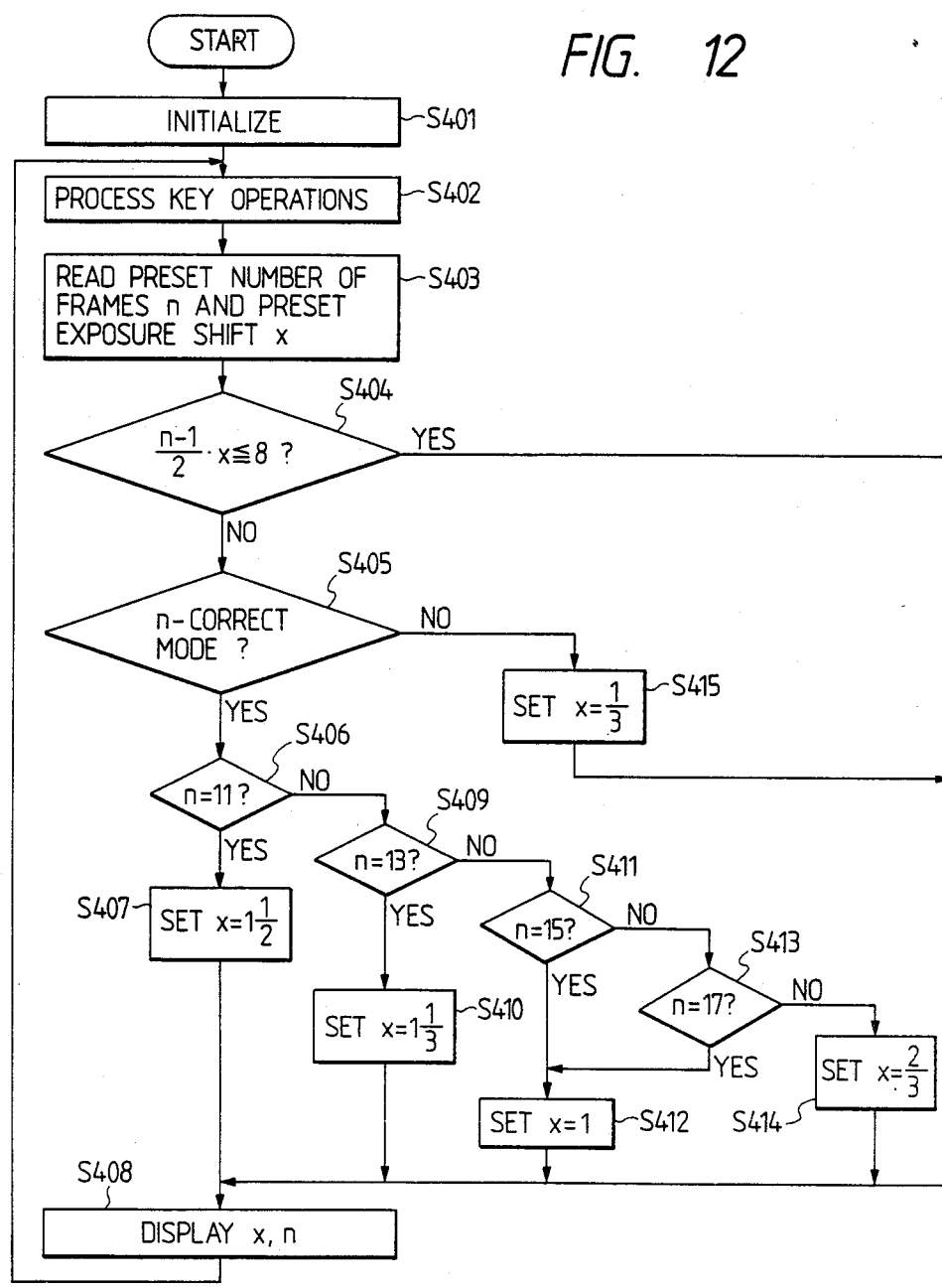
FIG. 12 is a flow chart showing the control sequence of a fourth embodiment.

FIG. 12 shows the control sequence of a fourth embodiment in which the number of frames is not modified, and the exposure shift per frame is forcedly changed to a maximum settable value within the limit of the relation (1).

When the power supply to the MPU 501 is started, the sequence shown in FIG. 12 is activated, and steps S401–S404 execute initialization by setting n at "3" and x at "⅓", then execute key input process, read the values n and x, calculate the value of:

$$\frac{n-1}{2} \cdot x$$

and discriminate whether said value is equal to or less than 8, in the same manner as already explained in relation to FIG. 8.

If said value is larger than 8, the sequence proceeds to a step S405 for discriminating whether the number n of frames is in the course of modification.

If so, the sequence proceeds to a step S406 for discriminating whether the number n of frames is "11".

If the number n is identified as "11", the sequence proceeds to a step S407 for setting the exposure shift x per frame at 1½, then to a step S408 for releasing the display signal 554, and returns to the step S402.

On the other hand, if the number n of frames is identified as not equal to "11" in the step S406, the sequence proceeds to a step S409 for discriminating whether the number n of frames is "13". If so, the sequence proceeds to a step S410 for setting the exposure shift x at 1⅓, which is subsequently displayed.

If the step S409 identifies that the number n of frame is not "13", the sequence proceeds to a step S411 for discriminating whether the number n is "15". If it is identified as "15", the sequence proceeds to a step S412 for setting the exposure shift x per frame at "1".

If the step S411 identifies that the number n of frames is not "15", the sequence proceeds to a step S413 for discriminating whether the number n is "17". If said number n is identified as "17", the sequence proceeds to the above-mentioned step S412.

If the step S413 identifies that the number n of frames is not "17", the sequence proceeds to a step S414 for setting the exposure shift x per frame at ⅔.

On the other hand, if the step S405 identifies that the number n is not in modification, the sequence proceeds to a step S415 as the shift x is being modified. In this case the maximum settable value of exposure shift x is exceeded, so that said value x is set at ⅓.

If the step S404 discriminates that the relation (1) is satisfied, the sequence proceeds to the above-mentioned step S408.

Figure 13A:
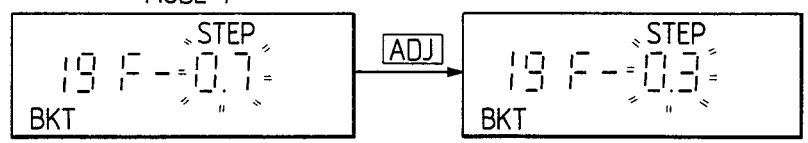
FIGS. 13A, 13B, 13C and 13D are views showing the switching of display at modifications of conditions in the fourth embodiment.

In a display state MODE 1 shown in FIG. 13A, the relation (1) is no longer satisfied if the exposure shift x per frame is modified to "1.0". Thus the step S415 sets x at ⅓, and there are displayed n=19 and x=0.3.

Figure 13B:
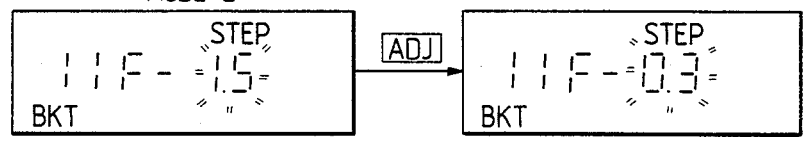

Also in a display state MODE 2 shown in FIG. 13B, if the shift x is modified to "1.7", the step S415 sets x at ⅓, and there are displayed n=11 and x=0.3.

Figure 13C:
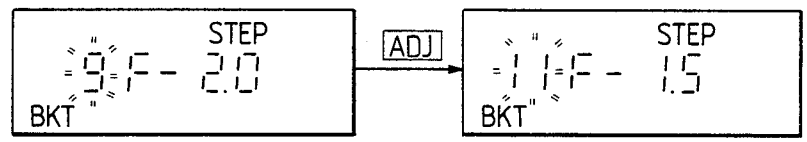

Also in a display state MODE 3 shown in FIG. 13C, if the number n is modified to "11", the step S405–S407 set x at 1½, and there are displayed n=11 and x=1.5.

Figure 13D:
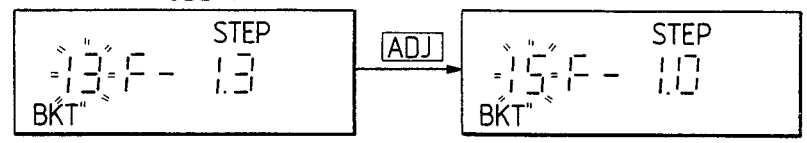

In a display state MODE 4 shown in FIG. 13D, if the number n is modified to "15", the steps S411 and S412 set x at "0.1", and there are displayed n=15 and x=1.0.

Figure 14:
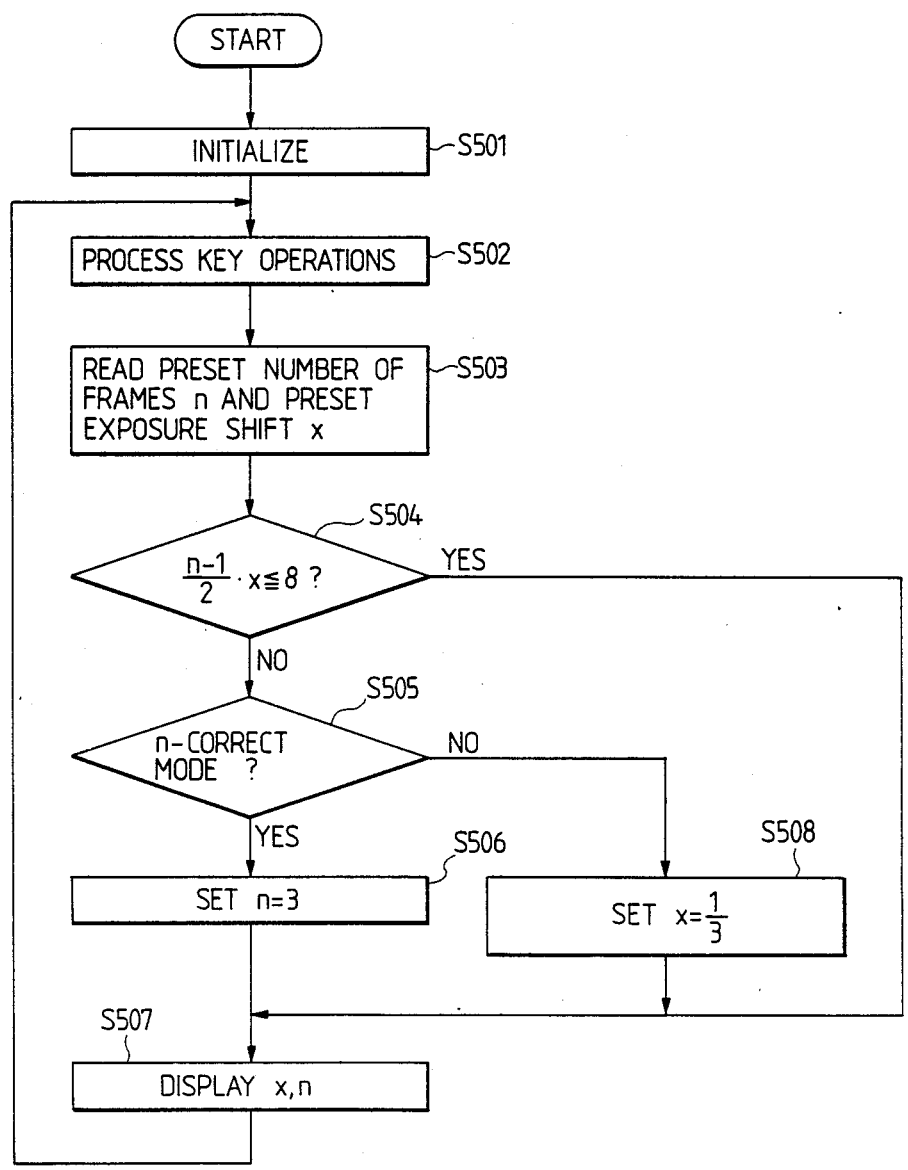
FIG. 14 is a flow chart showing the control sequence of a fifth embodiment.

FIG. 14 shows the control sequence of a fifth embodiment in which the number n of frames or the exposure shift x per frame, which is in the process of modification, is reset at the minimum value.

More specifically, if the relation (1) becomes not satisfied in the course of modification of the number of frames, said number n is reset at "3", and, if the relation (1) becomes not satisfied in the course of modification of the exposure shift x per frame, said exposure shift is reset at "⅓".

At the start of power supply to the MPU 501, the sequence shown in FIG. 14 is activated, and steps S501–S505 execute the initialization, key input process, reading of n and x, calculation of the value of:

$$\frac{n-1}{2} \cdot x$$

and discrimination whether the number n is in the course of modification, in the same manner as already explained in relation to FIG. 12. If the number n is identified as under modification, the sequence proceeds to a step S506 for setting the number n of frames at "3", and to a step S507 for display process.

If the step S505 identifies that the number n of frames is not in the course of modification, the value x is identified under modification and the sequence proceeds to a step S508 for setting x at "⅓" and then to the above-mentioned step S507.

Figure 15A:
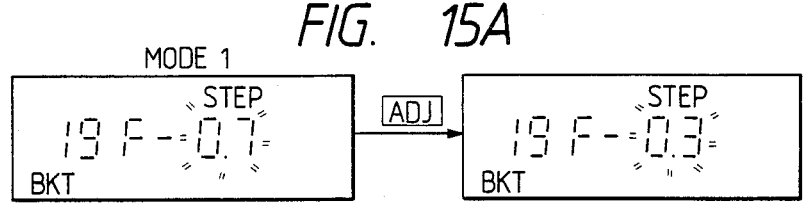
FIGS. 15A, 15B, 15C and 15D are views showing the switching of display at modifications of conditions in the fifth embodiment.

In a display state MODE 1 shown in FIG. 15A, if the exposure shift x per frame is modified to "1.0", the step S508 sets x at ⅓, and there are displayed n=19 and x=0.3.

Figure 15B:
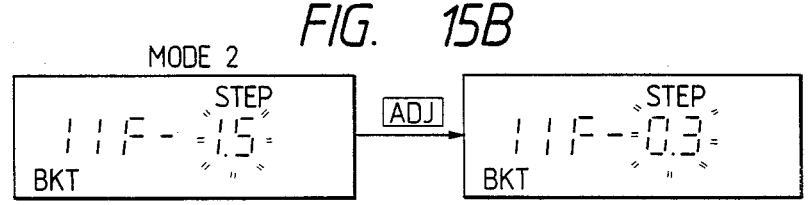

Also in a display state MODE 2 shown in FIG. 15B, if the exposure shift x per frame is modified to "1.7", the step S508 sets x at ⅓, and there are displayed n=11 and x=0.3.

Figure 15C:
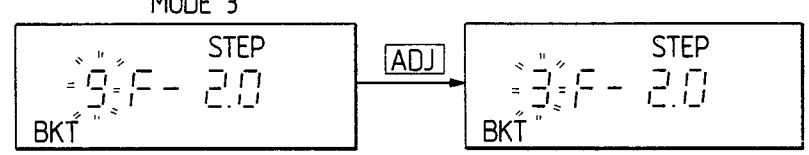

Also in a display state MODE 3 shown in FIG. 15C, if the number n of frames is modified to "11", the step S506 sets n at "3", so that there are displayed n=3 and x=2.0.

Figure 15D:
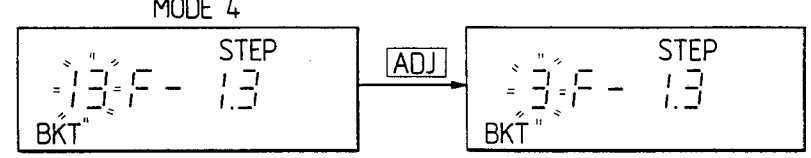

In a display state MODE 4 shown in FIG. 15D, if the number n of frames is modified to "15", the step S506 sets n at "3", so that there are displayed n=3 and x=1.3.

Figure 16:
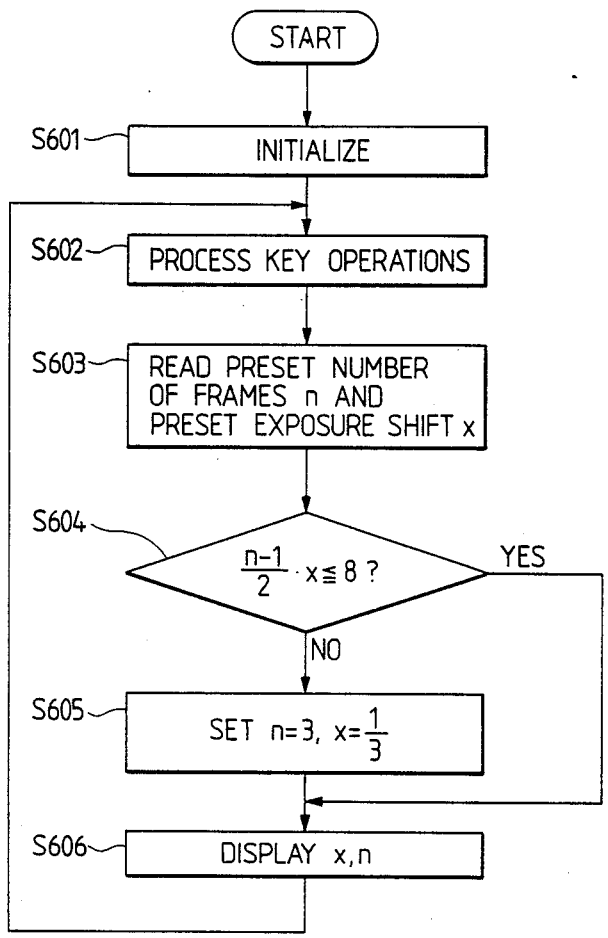
FIG. 16 is a flow chart showing the control sequence of a sixth embodiment.

FIG. 16 shows the control sequence of a sixth embodiment, in which the number n of frames and the exposure shift x per frame are forcedly modified, respectively the minimum values "3" and "⅓".

In this sequence, steps S601 to S604 execute a process as in the preceding embodiment shown in FIG. 14, and a step S605 sets n at "3" and x at "⅓". In the case, therefore, the minimum values of n and x, namely n=3 and x=0.3 are displayed as shown in FIGS. 17A to 17D.

Figure 19:
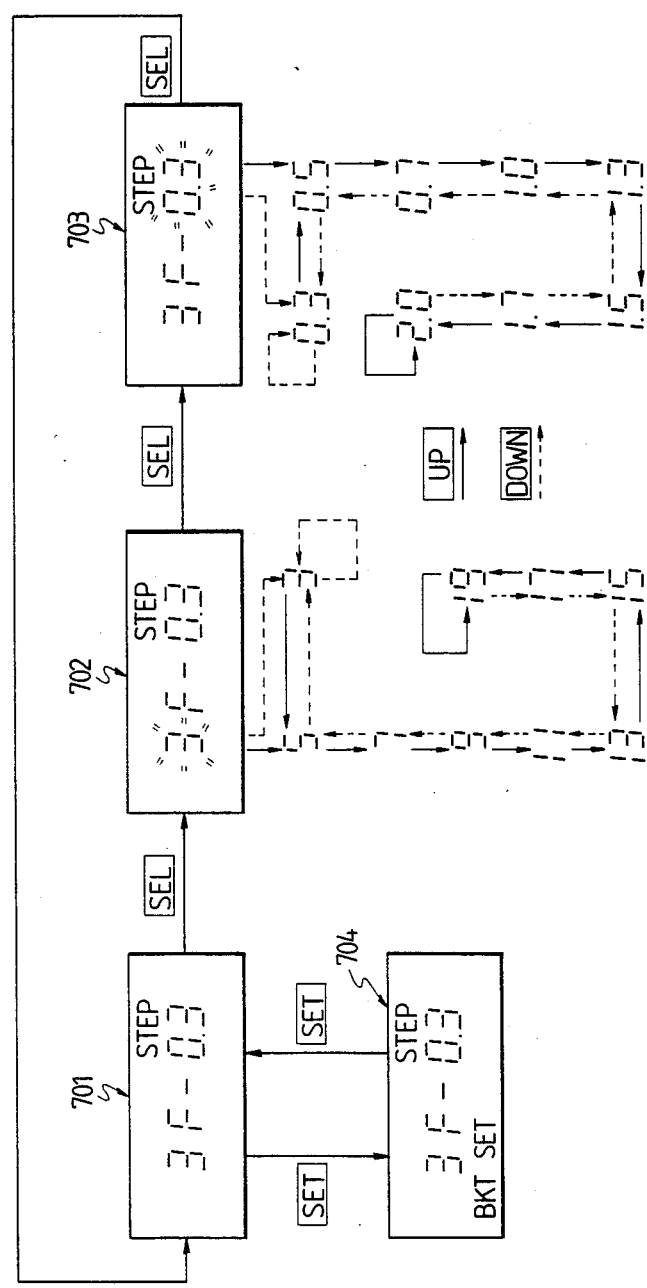
FIG. 19 is a view showing the switching of display in the data back unit shown in FIG. 18.

FIG. 18 is an external view of a data back unit constituting a seventh embodiment. Said data back unit 601 is different, in the structure of the setting panel, from the data back unit shown in FIG. 1. The setting panel 603 is provided with four keys 631–634 of functions as shown in FIG. 19.

In a data recording display mode 701, the actuation of a setting key 631 sets the automatic bracketing function and the display is shifted to a display mode 704. A repeated actuation of the setting key 631 restores the mode 701.

In said display mode 701, the actuations of a selecting key 632 changes the display to display modes 702 and 703 in succession. In said mode 702, the actuations of an up key 633 change the number of frames in the order of "3", "5", "7", . . . , "19" and the actuations of a down key 634 changes the number of frames in the order of "19", "17", "15", . . . , "3".

In said mode 703, the actuations of the up key 633 change the exposure shift in the order of "0.3", "0.5", . . . , "2.0", and the actuations of the down key 634 change the exposure shift in the order of "2.0", "1.7", "1.5", . . . , "0.3".

The control unit in the present embodiment is substantially same as that shown in FIG. 5, and will not, therefore, be explained further.

Figure 20:
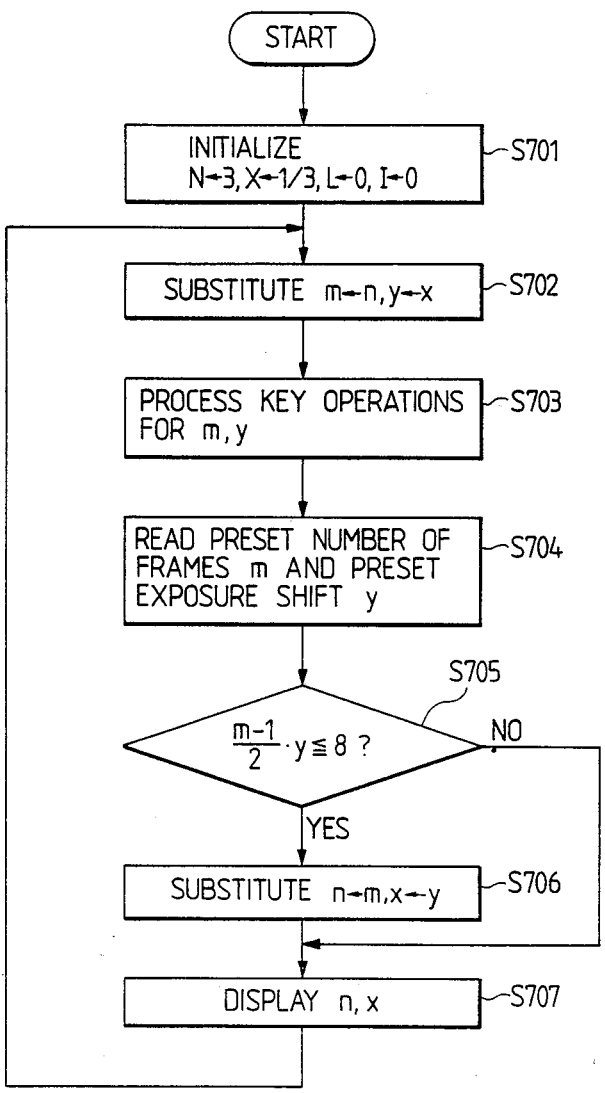
FIG. 20 is a flow chart showing the control sequence of the seventh embodiment.
Figure 17A:
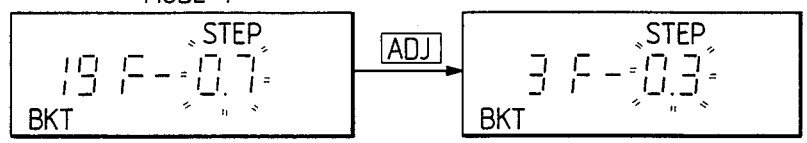
FIGS. 17A, 17B, 17C and 17D are views showing the switching of display at modifications of conditions in the sixth embodiment.
Figure 17B:
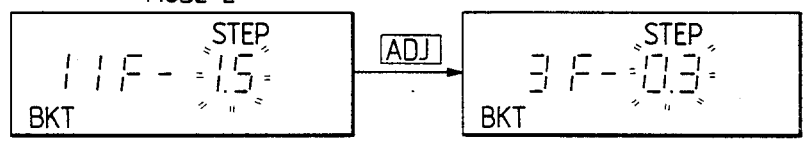
Figure 17C:
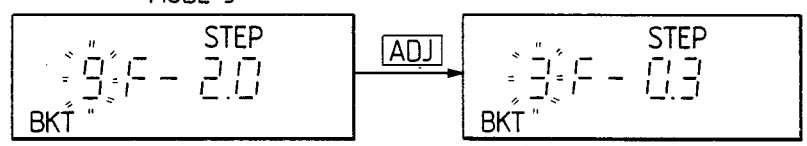
Figure 17D:
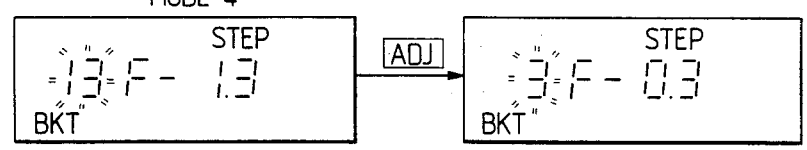

FIG. 20 shows the control sequence of the present embodiment, which is activated upon start of power supply to an unrepresented MPU.

At first a step S701 executes initialization to set the number n of frames at "3" and the exposure shift x per frame at "⅓". A step S702 substitutes n with m and x with y, and a step S703 executes a key input process with the up key 633 and the down key 634, for thus substituted values m and y. Then a step S704 reads the number m of frames and the exposure shift y entered with the keys, and a step S705 executes the aforementioned discrimination for m and y, based on the relation (1).

If the discrimination of the step S705 turns out affirmative, the sequence proceeds to a step S706 for substituting n with m and x with y. Thus the number n of frames and the exposure shift x are replaced by new values obtained by the key inputs in the step S703. Then a step S707 displays the values of n and x.

If the discrimination of the step S705 turns out negative, the sequence skips the step S706 and proceeds to the step S707, thereby invalidating the new values entered with the keys.

FIGS. 21A to 21D show examples of display in the above-explained control sequence.

Figure 21A:
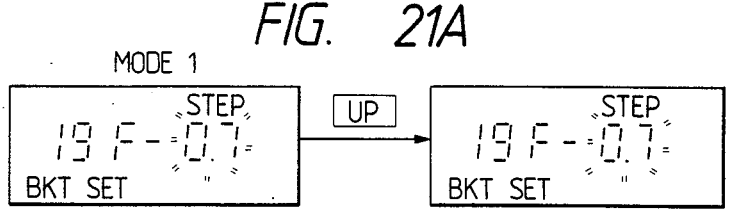
FIGS. 21A, 21B, 21C and 21D are views showing the switching of display at modifications of conditions in the seventh embodiment.

In a display state MODE 1 shown in FIG. 21A, if the exposure shift x is modified to "1.0", the discrimination of the step S705 becomes negative, so that said modification becomes ineffective. Thus there are displayed n=19 and x=0.7.

Figure 21B:
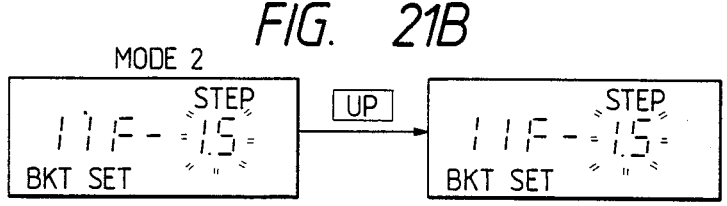

In a display state MODE 2 shown in FIG. 21B, if the exposure shift x is modified to "1.7", the discrimination of the step S705 becomes negative, so that there are adopted original values n=11 and x=1.5.

Figure 21C:
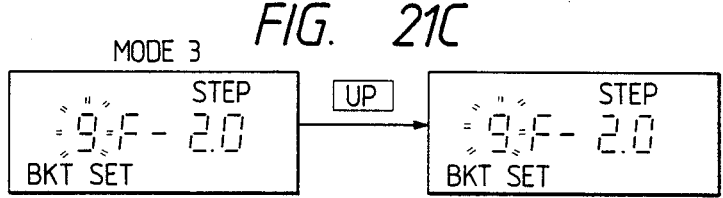

In a display state MODE 3 shown in FIG. 21C, if the number n of frames is modified to "11", the discrimination of the step S705 becomes negative, so that there are displayed n=8 and x=2.0.

Figure 21D:
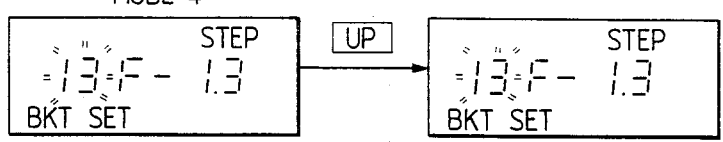

Also in a display state MODE 4 shown in FIG. 21D, if the number n of frames is modified to "15", said modification becomes ineffective and there are adopted original values n=13 and x=1.3.

In the foregoing embodiments, the automatic bracketing exposure is conducted by mounting a camera back unit, capable of automatic bracketing function, on a camera body, but it is also possible to incorporate the automatic bracketing function in the camera body itself.

What is claimed is:

1. An exposure control device for a camera, comprising:
    input means for entering a number of frames to be exposed and an amount of exposure shift per frame;
    discrimination means for comparing a total shift range of the exposure value determined by the combination of the number of frames and the amount of exposure shift thus entered, with a predetermined shift range;
    setting means for retaining the number of frames and the amount of exposure shift per frame entered by said input means in case said total shift range of the exposure value does not overflow said predetermined shift range, but, in case said total shift range of the exposure value overflows said predetermined shift range, modifying at least one of said number of frames and said amount of exposure shift per frame in such a manner that said total shift range of the exposure value does not overflow said predetermined shift range and retaining the number of frames and the amount of exposure shift per frame after said modification; and
    means for executing exposure of plural frames with stepwise shifts of the exposure value, according to the number of frames and the amount of exposure shift per frame thus retained.

2. A device according to claim 1, wherein said setting means is adapted to retain said amount of exposure shift per frame and to modify said number of frames only, in case said total shift range of the exposure value is identified to overflow said predetermined shift range.

3. A device according to claim 1, wherein said setting means is adapted to modify said number of frames to a minimum settable value, in case said total shift range of the exposure value is identified to overflow said predetermined shift range.

4. A device according to claim 1, wherein said setting means is adapted to modify said amount of exposure shift per frame to a minimum settable value, in case said total shift range of the exposure value is identified to overflow said predetermined shift range.

5. A device according to claim 1, wherein said setting means is adapted to modify said number of frames and said amount of exposure shift per frame respectively to minimum settable values, in case said total shift range of the exposure value is identified to overflow said predetermined shift range.

6. A device according to claim 1, wherein said input means has a mode for the input of said number of frames to be exposed and a mode for the input of said amount of exposure shift per frame; said setting means is adapted to modify said amount of exposure shift per frame to a minimum settable value in case said total shift range of the exposure value is identified to overflow said predetermined shift range during the mode for the input of said exposure shift; and said setting means is adapted to modify said amount of exposure shift per frame to a maximum value for which said total shift range of the exposure value does not overflow said predetermined shift range in case said total shift range of the exposure value is identified to overflow said predetermined shift range during the mode for the input of said number of frames.

7. A device according to claim 1, wherein said input means has a mode for the input of said number of frames to be exposed and a mode for the input of said amount of exposure shift per frame; said setting means is adapted to modify said amount of exposure shift to a minimum settable value in case said total shift range of the exposure value is identified to overflow said predetermined shift range during said mode for the input of exposure shift; and said setting means is adapted to modify said number of frames to a minimum settable value in case said total shift range of the exposure value is identified to overflow said predetermined shift range during the mode for the input of said number of frames.

8. An exposure control device for a camera, comprising:
    means for retaining a number of frames to be exposed and an amount of exposure shift per frame;
    means for modifying at least one of said number of frames and said amount of exposure shift per frame retaining in said retained means;
    discrimination means for comparing a total shift range of the exposure value determined by the combination of the number of frames and the amount of exposure shift thus modified, with a predetermined shift range;
    means for validating the combination of the number of frames and the amount of exposure shift per frame thus modified in case said total shift range of the exposure value is identified not to overflow said predetermined shift range, and for invalidating the combination of the number of frames and the amount of exposure shift per frame thus modified in case said total shift range of the exposure value is identified to overflow said predetermined shift range; and
    means for executing exposure of plural frames with stepwise shifts of the exposure value, according to the number of frames to be exposed and the amount of exposure shift per frame retained in said retaining means.

* * * * *